June 5, 1945. W. R. DRAY 2,377,331
HARVESTER THRESHER
Original Filed July 1, 1935  2 Sheets-Sheet 2
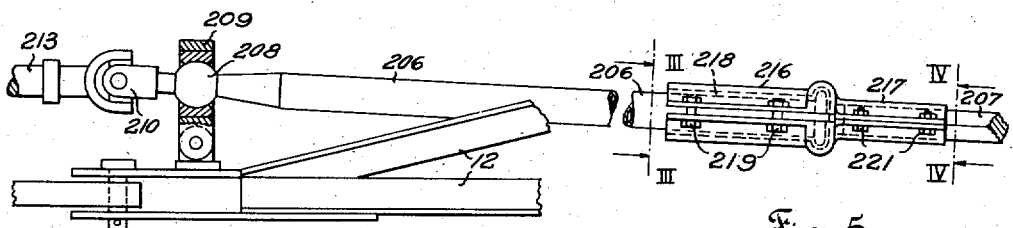
Fig. 2  Fig. 5
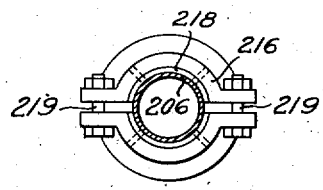  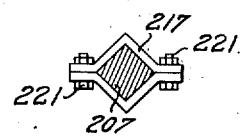
Fig. 3  Fig. 4
Inventor
Walter R. Dray
by J. D. Kane
Attorney Patented June 5, 1945

2,377,331

UNITED STATES PATENT OFFICE 2,377,331

HARVESTER THRESHER

Walter R. Dray, Kendall Township, Kendall County, Ill., assignor to Allis-Chalmers Manufacturing Company, Milwaukee, Wis., a corporation of Delaware Original application July 1, 1935, Serial No. 29,216, now Patent No. 2,262,453, dated November 11, 1941. Divided and this application June 29, 1940, Serial No. 343,126

8 Claims. (Cl. 56—20)

This invention relates in general to improvements of particular utility in harvesting machines of the tractor-drawn and power-operated type, especially machines of the class wherein the mechanism for harvesting grain or the like crops is combined in a single apparatus with the mechanism for threshing and separating the threshed grain or the like from the straw or stalks or from foreign material. Machines of this class are generally known as harvester-threshers or combine harvesters or combines.

The present application is a division of applicant's copending application Serial No. 29,216, filed July 1, 1935, which has matured to Patent No. 2,262,453, granted November 11, 1941.

The present invention contemplates and has as an object thereof the provision of an improved harvester or like machine of the tractor-drawn and power-operated type, more particularly such machines as are of the combined harvester-thresher type, and including novel power transmitting mechanism through which power is supplied from a driving source, such as a tractor by which the harvester is drawn through the field, to the operating mechanisms of the harvester, and insuring an efficient drive thereof and protection to the operating parts in spite of any displacement of the power source relative to the harvester, as the tractor moves over uneven ground and makes turning movements of any degree during normal operation.

It is a further object of this invention to provide an improved form of driving connection for a harvester, between a power source, such as a tractor, and the operating mechanisms of the harvester, and including a unitary coupling and driving connection between shaft sections carried by the harvester and one of which is flexibly connected to the power source on the tractor and the other of which is connected to drive the operating mechanisms of the harvester, and providing for both free longitudinal relative movement of the shaft sections and an overload responsive clutching connection between them.

It is a further object of this invention to provide an improved form of drive from a power source on a tractor to operating mechanisms on a harvester or like machine of the tractor-drawn and power-operated type and utilizing a drive shaft operatively mounted on a draft portion of the machine and connected in driven relation to the power source on the tractor, with the drive shaft journaled in a bearing flexibly mounted on the draft portion of the machine to accommodate for relative movements of the tractor with respect to the machine in the operation of the latter by the tractor.

These and other objects and advantages are obtained by the present invention, various novel features of which will be apparent from the description and accompanying drawings, disclosing an embodiment of the several features of the invention, and will be more particularly pointed out in the claims.

In the accompanying drawings:

Fig. 2 is a fragmental view in side elevation, with parts in section, of the forward portion of the power drive shaft and its support on the draft element of the harvester-thresher of Fig. 1;

Figs. 3 and 4 are sectional views in the planes of the lines III—III and IV—IV, respectively, of Fig. 5; and Fig. 5 is a fragmental view in top elevation of a portion of the power drive shaft, showing the driving connection between the forward and rear sections of such drive shaft.

Figure 1:
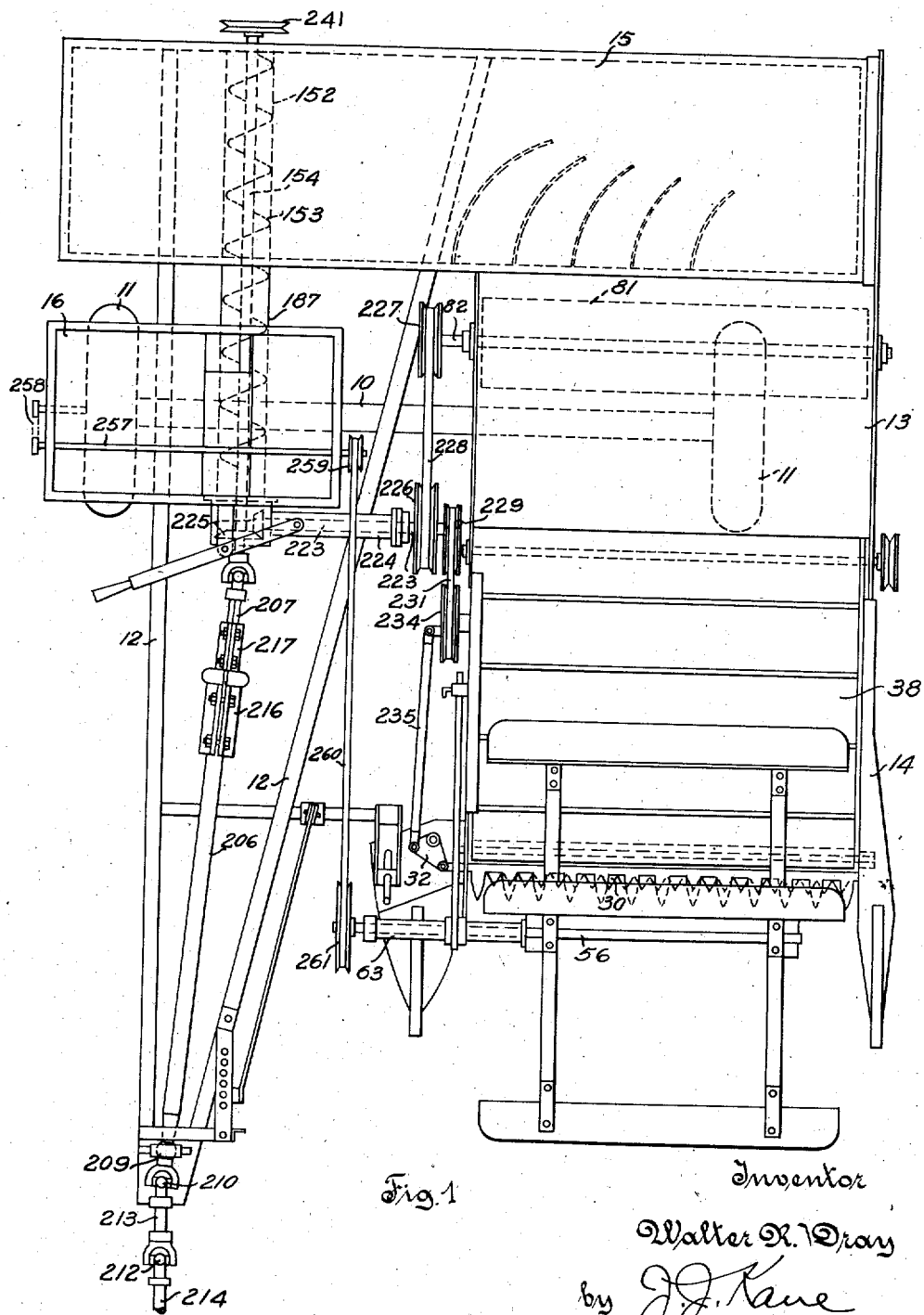
Fig. 1 is a plan view of a harvester-thresher or combine embodying features of the present invention.

Referring to the drawings, the invention is disclosed as a part of a harvester-thresher including a main support in the form of a steel tube 10 carrying journals for the supporting and traction wheels 11 and extending transversely of the normal direction of travel of the apparatus. On this tubular support 10 is mounted an auxiliary supporting structure of a fabricated character and including a forwardly projecting fabricated frame 12 serving as a drawbar support through which tractive effort of a source of traction, such as a power tractor, may be applied through a suitable coupling at the forward end of the frame 12, and as a support for a power shaft through which power is supplied from a tractor for operating the several mechanisms of the apparatus, and a framework on which are carried several major elements of the apparatus, such as the supporting and enclosing housing 13 for the threshing mechanism, with the auxiliary header frame 14 carried by the latter housing, and the separator housing 15 communicating with the discharge side of the housing 13 for the threshing mechanism and extending transversely thereof, and a storage bin 16 for clean grain. The position of the traction wheels and their journals is such that the weight of the harvester-thresher is balanced about the axis of rotation of these wheels.

The header frame 14 is of troughlike form open at its forward and rear ends and has side walls fitting closely within side walls of the housing 13 for the threshing mechanism at the open forward side thereof, and the header frame is mounted on the housing 13 through a pivotal connection between the side walls of the header frame and the side walls of the housing 13, so that the lower forward edge of the header frame may be swung upward and downward, by suitable operating mechanism more particularly disclosed in the above mentioned parent application, to a desired position of adjustment relative to the ground.

At the forward end of the header frame 14 adjacent the bottom plate thereof is mounted a sickle device 30 of conventional design and having an operating rod pivotally attached to an actuating plate 32 pivotally mounted on a plate extending laterally from and supported on the inner side wall of the header frame.

Mounted within the header frame adjacent the lower edges of the side walls thereof is a traveling conveyer 38 of the draper belt type, and it travels over a driving roller disposed at the upper end of the draper and having a drive shaft provided with shaft journals rotatably mounted in bearings on the side walls of the header frame near the upper end thereof and on the adjacent portions of the side walls of the housing 13, the driving shaft of this upper roller preferably being coincident with the axis on which the header frame has its pivotal movement on the side walls of the housing 13. The draper belt conveyer 38 travels at its lower end about a foot roller whose shaft has journal portions rotatably mounted in bearings in the side walls of the header frame 14.

A rotatable gathering reel is mounted on the header frame in operative position relative to the sickle and the traveling draper. This reel includes a rotatable shaft 56 mounted in a bearing carried by a bearing housing 63, preferably supported for adjustment to vary the position of the reel with respect to the cutting sickle 30.

The threshing cylinder, indicated generally at 81, comprises an operating shaft 82 rotatably mounted in bearings in the side walls of the housing. The details of the separating mechanism, associated with and enclosed within the separator housing 15, disclosed and described in full in the above mentioned parent application, are not disclosed herein beyond a showing of the receiving trough or well 152 in which the threshed grain is received and from which it is removed forwardly to the grain bin 16 by a screw conveyer 153 on a shaft 154. This shaft 154 also serves to transmit power for driving various operating mechanisms of the separator, as disclosed in the aforesaid parent application.

In operation, the harvested grain, after being cut by the sickle 30, is moved upwardly and rearwardly along the traveling draper 38 and is fed therefrom to the threshing mechanism. The straw and threshed grain discharged from the threshing mechanism passes into the separator housing 15 where they are subjected to the action of the separating mechanism which serves to separate the threshed grain from the straw, the latter being discharged from the separator housing, and the threshed grain being collected in the receiving well 152 in which the screw conveyer 153 operates, the latter serving to convey this grain forwardly and through a tubular extension 187 of such well, into the grain bin 16.

Power for operating the various mechanisms of the apparatus is derived from a main power shaft made up of longitudinally adjustable sections 206, 207. The forward section 206 is provided with a spherical journal portion 208 rotatably supported in a bearing 209 having a spherical bearing surface and being pivotally mounted, as indicated more particularly in Fig. 2, on the forward end of the drawbar frame 12 to move, with fore and aft and up and down directional components, in a plane extending in the general direction of the axis of the shaft section 206. It will be noted that, by reason of the engagement of the spherical surfaces of the shaft journal and the bearing, the shaft journal is restricted with respect to axial movement relative to its cooperative bearing. The shaft section 206 is connected through a double universal connection, comprising universal joints 210 and 212 and an intermediate shaft coupling 213, to the rear end of a power shaft 214 carried by a tractor, not shown, this power shaft preferably being operable at speeds independent of the speed of travel of the tractor.

The connection between shaft sections 206 and 207 is in the form of a combined slip clutch and telescopic connection including a split coupling sleeve comprising forward and rear portions 216 and 217, respectively. The forward section of the coupling is provided on its interior surface with a friction clutch lining 218 adapted, when the clamping bolts 219 are drawn up sufficiently, to cause the lining to frictionally grip the shaft section 206 with a desired pressure, to insure rotation of the coupling sleeve with the shaft section 206 under all conditions of normal load, but permitting slippage of the shaft section 206 with respect to the coupling sleeve when the load on the apparatus, as transmitted through the forward section 206 of the coupling sleeve, is above a predetermined normal value.

The sections of the split rear section 217 of the coupling are preferably interiorly machined and are clamped in desired set position by bolts 221 so as to form a socket of rectangular cross section for telescopic driving connection with the correspondingly shaped portion of the shaft section 207, the latter being telescopically slidable within the socket of rectangular cross section.

The shaft section 207 is connected through a universal coupling with the shaft 154 of the horizontal grain conveyer 153, this latter shaft having a suitable bearing in a housing at the lower forward end of the grain bin 16.

With this arrangement of the main power shaft, it is free to accommodate itself, through the combined friction clutch and telescopic joint between its sections, and the pivoted spherical bearing 209 of the shaft section 206, and the several universal couplings, to all relative displacements of the power shaft 214 of the tractor, as the latter moves over uneven ground and makes turning movements of any degree, and the mechanisms of the harvester or like apparatus, as well as the engine of the tractor, are protected against damage due to the overloads.

A power shaft 223, mounted in a bearing housing 224 supported on the structure of the bin 16 or the supporting frame, is connected through a set of bevel gears, indicated at 225, to the driving shaft 154; and the shaft 223 is provided with a V-groove sheave 226, the latter being connected with a V-groove sheave 227 on the operating shaft 82 of the threshing cylinder, through a V-belt 228, preferably with a suitable idler sheave cooperating with the belt to secure the desired tension thereof. A second V-groove sheave 229 is mounted on the shaft 223 and is connected through a V-belt 231 to a V-pulley 234 mounted on the inner side wall of the header frame, preferably through a suitable idler pulley. The sheave 234 drives a pitman 235, through an eccentric on the sheave, the pitman actuating the sickle device through its connection with the actuating plate 32 and the operating rod of the sickle. The belt 231, through driving connections not shown herein, but disclosed in the aforementioned parent application, may also serve as a driving source for the upper driving roller of the feed draper 38.

Power is supplied from a sheave 241 on the rear end of the shaft 154, and through suitable driving connections therefrom, as disclosed in the aforementioned parent application, to operate the mechanisms of the separator.

A shaft 257 is mounted in bearings carried by the wall of the storage bin, and a drive, indicated at 258, including pulleys or sprockets on the outer end of the shaft 257 and on the hub of the adjacent traction wheel 11 serves to actuate the shaft 257 at a speed corresponding to the speed of travel of the apparatus over the ground. The inner end of the shaft 257 is provided with a V-pulley 259 connected by a V-belt 260 to a V-pulley 261 on the reel shaft 56.

The diameters of the various driving and driven pulleys are so selected as to give the desired normal speeds of rotation to the driven shafts.

It should be understood that features and operating effects of the invention disclosed hereinabove have definite commercial applications and utility other than in the particular apparatus described or in the specific combinations with various other features defined in the claims, and the invention is to be considered as embracive of these various applications and utilities. And it is not desired that the invention be limited to the exact details of construction shown and described herein for obvious modifications may occur to persons skilled in the art.

It is claimed and desired to secure by Letters Patent:

1. In a tractor-drawn, power-operated harvesting device having a forwardly extending draft portion for coupling to a tractor, in combination, a fore and aft extending sectional power transmitting shaft for driving operating mechanism of the harvesting device and comprising forward and rear shaft sections, and a spherical seating bearing for a spherical journal portion of said forward shaft section, said bearing being pivotally mounted on said forwardly extending draft portion to permit movement of said bearing longitudinally of said draft portion, and the rear section of said shaft being in substantial alinement with said forward shaft section and connectable in driving relation to the operating mechanisms of the harvesting device, and a power transmitting connection between said forward and rear shaft sections comprising an element connected to one of said shaft sections and with which the other shaft section has a telescoping driving connection affording relative longitudinal movement between said shaft sections while maintaining the driving connection therebetween.

2. In a tractor-drawn, power-operated harvester-thresher having a forwardly extending draft portion for coupling to a tractor, in combination, a fore and aft extending sectional power transmitting shaft for driving operating mechanism of the harvester-thresher and comprising forward and rear shaft sections, and a bearing for a journal portion of said forward shaft section pivotally mounted on said forwardly extending draft portion to permit movement of said bearing longitudinally of said draft portion, and the rear section of said shaft being in substantial alinement with said forward shaft section and connectable in driving relation to the operating mechanisms of the harvesting device, and a unitary power transmitting connection between said forward and rear shaft sections comprising a sleeve element provided at one portion with an internal clutch releasably engageable in driving relation with one of said shaft sections and at another portion with a socket element with which the other of said shaft sections has a freely adjustable telescopic driving connection, said clutch connection being automatically releasable on occurrence of a predetermined overload on said rear shaft section.

3. In a tractor-drawn, power-operated harvesting-thresher or the like having a forwardly extending draft element with a power transmitting shaft carried thereby and connectable at its forward and rear ends to a power source on the tractor and operating mechanism of the harvester-thresher, respectively, a sectional power transmitting shaft adapted to supply power from the tractor to the operating mechanism of the harvester-thresher and including an overload release clutch connection therein and comprising a forward shaft section and a shaft section to the rear thereof, and a guided freely adjustable telescopic connection between said forward and rear shaft sections, said forward shaft section having a journal portion adjacent its forward end, and a bearing for said journal portion movably mounted on and adjacent the forward end of the draft element, said journal portion being restrained against appreciable axial movement relative to said bearing, the movable mounting of said bearing on the draft element affording movement of said journal portion of said forward shaft section in a vertical plane while said forward shaft section is maintained in substantial axial alinement with said rear shaft section.

4. In a power transmission device for a harvester of the tractor-drawn, power-operated type having a forwardly extending draft element for draft connection to a tractor and a fore and aft extending power transmitting shaft rotatably mounted on the draft connection and connectable at its forward and rear ends to a power source on the tractor and to operating mechanism of the harvester, respectively, in combination, forward and rear substantially axially alined shaft sections, and a driving connection therebetween affording free relative longitudinal guided movement of said shaft sections while maintaining them in substantially axial alinement, and a rotatable mounting for said sectional shaft including a bearing for a journal portion of said forward shaft section adjacent the forward end thereof, said bearing having a support pivotally mounted along a transverse axis on the forward portion of the draft element and affording movement of said journal portion in a vertical plane while said forward shaft section is maintained in substantially axial alinement with said rear shaft section.

5. In a sectional shaft power transmission device for a tractor-drawn, power-operated harvester having a forwardly extending draft element, in combination, forward and rear substantially axially alined shaft sections, and a driving connection therebetween affording free relative longitudinal guided movement of said shaft sections while maintaining them in substantially axial alinement, and means for rotatably mounting said sectional shaft and including a forward bearing movably mounted on a forward portion of the draft element and providing a bearing for a journal portion of said forward shaft section wherein said journal portion is restrained against appreciable axial movement relative to said bearing and affording up and down and fore and aft movement of said journal portion while said forward shaft section is maintained in substantially axial alinement with said rear shaft section.

6. In a power transmission device for a harvester of the tractor-drawn, power-operated type having a forwardly extending draft element for draft connection to a tractor and a fore and aft extending power transmitting shaft connectable at its forward and rear ends to a power source on the tractor and to operating mechanism of the harvester, respectively, in combination, forward and rear substantially axially alined shaft sections, and a driving connection therebetween affording an overload release clutch connection between said shaft sections and free relative longitudinal guided movement therebetween while maintaining them in substantially axial alinement, and means for rotatably mounting said sectional shaft including a bearing for a journal portion of said forward shaft section, said bearing being movable mounted on a forward portion of the draft element, and affording up and down and fore and aft movement of said journal portion while said forward shaft section is maintained in substantially axial alinement with said rear shaft section.

7. In a sectional shaft power transmission device for a tractor-drawn, power-operated harvester having a forwardly extending draft element, in combination, forward and rear substantially axially alined shaft sections, and a driving connection therebetween affording an overload release clutch connection between said shaft sections and free relative longitudinal guided movement therebetween while maintaining them in substantially axial alinement, and means for rotatably mounting said sectional shaft and including a forward bearing pivotally mounted on a forward portion of the draft element and providing a bearing for a journal portion of said forward shaft section wherein said journal portion is restrained against appreciable axial movement relative to said bearing and affording up and down and fore and aft movement of said journal portion while said forward shaft section is maintained in substantially axial alinement with said rear shaft section.

8. In a power transmission device for a tractor-drawn, power-operated harvester-thresher, in combination, a rotatably mounted, sectional power transmitting shaft for driving operating mechanisms of the harvester-thresher and connectable to a lower source on the tractor, said sectional power shaft including a plurality of longitudinally alined shaft sections, and a unitary power transmitting element with which one of said shaft sections has a free telescopic joint driving connection and having an overload release clutch connection with the other of said shaft sections for insuring driving relation between said shaft sections under normal load conditions while permitting relative slipping thereof on loads above a predetermined value and permitting relative longitudinal movement of said shaft sections under all conditions, and a movably mounted bearing for a journal portion of a longitudinally movable one of said shaft sections and providing movement of the bearing in a direction having a substantial component longitudinally of said shaft section, said journal portion being confined in said bearing against appreciable axial movement relative to said bearing.

WALTER R. DRAY.

CERTIFICATE OF CORRECTION.

Patent No. 2,377,331.                               June 5, 1945.

WALTER R. DRAY.

It is hereby certified that error appears in the printed specification of the above numbered patent requiring correction as follows: Page 3, second column, line 19-20, claim 3, for the word "harvesting-thresher" read --harvester-thresher--; page 4, first column, line 30, claim 6, for "movable" read --movably--; and second column, line 20, claim 8, for "lower" read --power--; and that the said Letters Patent should be read with this correction therein that the same may conform to the record of the case in the Patent Office.

Signed and sealed this 11th day of September, A. D. 1945.

Leslie Frazer (Seal)                           First Assistant Commissioner of Patents.

tions while maintaining them in substantially axial alinement, and means for rotatably mounting said sectional shaft and including a forward bearing movably mounted on a forward portion of the draft element and providing a bearing for a journal portion of said forward shaft section wherein said journal portion is restrained against appreciable axial movement relative to said bearing and affording up and down and fore and aft movement of said journal portion while said forward shaft section is maintained in substantially axial alinement with said rear shaft section.

6. In a power transmission device for a harvester of the tractor-drawn, power-operated type having a forwardly extending draft element for draft connection to a tractor and a fore and aft extending power transmitting shaft connectable at its forward and rear ends to a power source on the tractor and to operating mechanism of the harvester, respectively, in combination, forward and rear substantially axially alined shaft sections, and a driving connection therebetween affording an overload release clutch connection between said shaft sections and free relative longitudinal guided movement therebetween while maintaining them in substantially axial alinement, and means for rotatably mounting said sectional shaft including a bearing for a journal portion of said forward shaft section, said bearing being movable mounted on a forward portion of the draft element, and affording up and down and fore and aft movement of said journal portion while said forward shaft section is maintained in substantially axial alinement with said rear shaft section.

7. In a sectional shaft power transmission device for a tractor-drawn, power-operated harvester having a forwardly extending draft element, in combination, forward and rear substantially axially alined shaft sections, and a driving connection therebetween affording an overload release clutch connection between said shaft sections and free relative longitudinal guided movement therebetween while maintaining them in substantially axial alinement, and means for rotatably mounting said sectional shaft and including a forward bearing pivotally mounted on a forward portion of the draft element and providing a bearing for a journal portion of said forward shaft section wherein said journal portion is restrained against appreciable axial movement relative to said bearing and affording up and down and fore and aft movement of said journal portion while said forward shaft section is maintained in substantially axial alinement with said rear shaft section.

8. In a power transmission device for a tractor-drawn, power-operated harvester-thresher, in combination, a rotatably mounted, sectional power transmitting shaft for driving operating mechanisms of the harvester-thresher and connectable to a lower source on the tractor, said sectional power shaft including a plurality of longitudinally alined shaft sections, and a unitary power transmitting element with which one of said shaft sections has a free telescopic joint driving connection and having an overload release clutch connection with the other of said shaft sections for insuring driving relation between said shaft sections under normal load conditions while permitting relative slipping thereof on loads above a predetermined value and permitting relative longitudinal movement of said shaft sections under all conditions, and a movably mounted bearing for a journal portion of a longitudinally movable one of said shaft sections and providing movement of the bearing in a direction having a substantial component longitudinally of said shaft section, said journal portion being confined in said bearing against appreciable axial movement relative to said bearing.

WALTER R. DRAY.

CERTIFICATE OF CORRECTION.

Patent No. 2,377,331.  June 5, 1945.

WALTER R. DRAY.

It is hereby certified that error appears in the printed specification of the above numbered patent requiring correction as follows: Page 3, second column, line 19-20, claim 3, for the word "harvesting-thresher" read --harvester-thresher--; page 4, first column, line 30, claim 6, for "movable" read --movably--; and second column, line 20, claim 8, for "lower" read --power--; and that the said Letters Patent should be read with this correction therein that the same may conform to the record of the case in the Patent Office.

Signed and sealed this 11th day of September, A. D. 1945.

Leslie Frazer (Seal)  First Assistant Commissioner of Patents.